United States Patent [19]
Quinn

[11] 4,038,593
[45] July 26, 1977

[54] REGULATED HIGH VOLTAGE AC POWER SUPPLY WITH REGULATED D.C. BIAS CURRENT

[75] Inventor: Halsey P. Quinn, Los Angeles, Calif.

[73] Assignee: Xerox Corporation, Stamford, Conn.

[21] Appl. No.: 617,112

[22] Filed: Sept. 26, 1975

[51] Int. Cl.² .................... H01T 19/00; H02M 7/515
[52] U.S. Cl. .......................................... 323/4; 323/20; 323/22 T; 361/225; 363/134
[58] Field of Search ................ 250/324; 317/262 A; 321/1, 18, 19, 45 R; 323/4, 6, 7, 20, 21, 24, 44 R, 62, 22 T

[56] References Cited

U.S. PATENT DOCUMENTS

| | | | |
|---|---|---|---|
| 3,701,937 | 10/1972 | Combs | 321/2 |
| 3,702,434 | 11/1972 | Ryan | 321/2 X |
| 3,819,942 | 6/1974 | Hastwell et al. | 317/262 A |
| 3,887,861 | 6/1975 | Anzai et al. | 321/18 |
| 3,909,702 | 9/1975 | Hart | 323/20 X |

Primary Examiner—A. D. Pellinen
Attorney, Agent, or Firm—James J. Ralabate; Franklyn C. Weiss; Ronald L. Taylor

[57] ABSTRACT

A circuit for concurrently producing regulated high voltage a.c. current and bias d.c. current on one output line, where all regulation is accomplished in low voltge circuits, power supply being particularly useful as the power source for copier and duplicator corotrons. The basic wave shape is a rectangular wave which is amplified and regulated for application as the a.c. input to a corotron. The corotron itself is used as the rectifier for the d.c. bias current, with this current being variable in either the positive or negative direction by varying the symmetry of the a.c. rectangular wave. Since the part of the wave which has the shorter duration must have the higher amplitude, and current in the corotron increases with voltage, a feedback loop which controls the rectangular wave duty cycle will regulate the d.c. bias current as well.

8 Claims, 3 Drawing Figures

REGULATED HIGH VOLTAGE AC POWER SUPPLY WITH REGULATED D.C. BIAS CURRENT

BACKGROUND OF THE INVENTION

A. Field of the Invention

This invention relates to the design of power supplies and more specifically to power supplies for corotrons to be used in duplicating and copying equipment.

B. Description of the Prior Art

A typical copier or duplicator contains a photoreceptor surface implemented from semi-conducting material formed onto a rotating drum. The drum surface will typically be changed to a particular d.c. potential, and then light from an original printed or typed paper is allowed to fall on the drum discharging those areas of the drum corresponding to the white spaces on the paper. As the drum continues to revolve, the surface is rotated to a point where toner is dusted onto the drum. The toner will attach to the drum only at those points that are charged, thus forming a black-on-white image on the drum. Finally, this image is transferred electrostatically from the drum to a sheet of paper and fused thereon in a fusing process.

To accomplish this process a variety of corotrons are required. A corotron is a wire extending the axial length of the drum. It is outside of the drum and is surrounded on one side by the drum semi-conductor surface and on the other three sides by a channel. A. C. voltage, typically in excess of 3,000 volts, is applied to the wire producing a corona between the wire and the channel. The presence of this alternating corona field will discharge the semi-conductor drum surface to a nominal zero volts. This variety of corotron is used to discharge the semi-conductor drum surface prior to cleaning the excess toner from the drum after the image has been transferred to the paper.

Since each corotron requires a different d.c. component, it is typical that each corotron must have its own power supply. These power supplies typically comprise an a.c. source which is usually line voltage transformed to several thousand volts for application to the corotron in series with a regulated and adjustable d.c. power supply to supply the d.c. bias.

A problem with this variety of power supply is its high cost and relative lack of reliability since two separate power supplies must be provided, both of which contain regulation and adjustment circuits in their high-voltage lines. Furthermore, the cost of these power supplies is relatively high since a separate a.c. and d.c. power supply must be constructed, and these power supplies must have a large number of high-voltage parts.

A further problem is that the corotron is itself a rectifier. More specifically, a corona will be created and conduction will begin when the corotron wire has an instantaneous potential of 3,000 volts negative while a corona and conduction will not start until the central wire has about 3,200 volts of instantaneous potential in a positive direction. This is a result of the phenomenon that electrons will leave a sharp surface more readily than a flat surface.

It is because of this rectification by the corotron and the resulting net d.c. bias on the corotron wire when high alternating voltages are applied that a d.c. series power supply must be supplied in a corotron power supply even when a net zero d.c. bias is required for the corotron's proper operation. It is therefore required of a corotron power supply that it has an adjustable d.c. series power supply even if a zero volt bias is required.

It can therefore be seen that there is a need in the copier industry for a corotron power supply which can simultaneously supply regulated and adjustable high-voltage a.c. current and d.c. current. It would be desirable for these two power supplies to be integrated into a single circuit and it would reduce cost and increase reliability if the adjustment and regulation of these voltages could be done at a low voltage level.

SUMMARY OF THE INVENTION

This invention is unique in that it uses the corotron itself as a rectifying circuit to produce either a positive or negative d.c. bias. This is done by using a rectangular wave instead of a sine wave to generate the high-voltage alternating current, and by varying the duty cycle of this same rectangular wave to produce the desired d.c. bias.

These results are possible because of the following characteristics of transformers and corotrons in general. With regard to a transformer, it is universally true that if one end of a transformer secondary is grounded, the average voltage at the other end of the secondary will be zero; that is, the sum of all of the instantaneous positive and negative voltages will be approximately zero. In the usual case, a symmetrical sine wave or square wave is applied to the primary of a transformer and the secondary positive and negative voltages will be identical. However, if a rectangular wave with an unsymmetrical duty cycle is applied, and if the average must identically equal zero volts, then it is clear that at the secondary, that polarity being produced for a shorter amount of time must be produced at a higher voltage. For example, if the output from a secondary winding is positive for a shorter amount of time and negative for a longer amount of time, then the maximum instantaneous positive voltage will exceed the maximum instantaneous negative voltage.

When a corotron receives this unsymmetrical rectangular wave at its central wire, it will conduct in both directions but it will conduct more heavily when the positive voltage is being applied to the wire since the positive voltage is greater and current in a corotron over the operating voltage range increases faster than applied voltage. Therefore, there will be a net d.c. bias current in a positive direction. However, as stated earlier, since the corotron conducts more heavily when the central wire is negative, there will also be a negative bias on the corotron, and if the circuit is adjusted properly, these positive and negative biases will cancel.

If the amount of dissymmetry is adjustable and regulated, then the d.c. bias can be varied from a positive to a negative level, either exactly overcoming the corotron's initial bias, or providing any positive or negative bias required of the corotron in its particular use in the copying equipment.

One advantage of this circuit is that a single power supply produces both a.c. and d.c. currents required by the corotron thus reducing the cost of manufacturing this unit. An additional advantage of this circuit, as will be described hereinbelow, is that all regulation occurs at a low-voltage level, increasing the reliability of the circuit as well as decreasing the cost of manufacture.

This power supply design is being discussed in relation to a copier or duplicator corotron in that it is one use to which this type of power supply can be put. However, this power supply can be used to advantage, because of the increased reliability and decreased cost considerations mentioned above, in any environment where a rectifying load requires a high-voltage a.c. current and a d.c. bias current.

DETAILED DESCRIPTION OF THE PREFERRED EMBODIMENT

Figure 1:
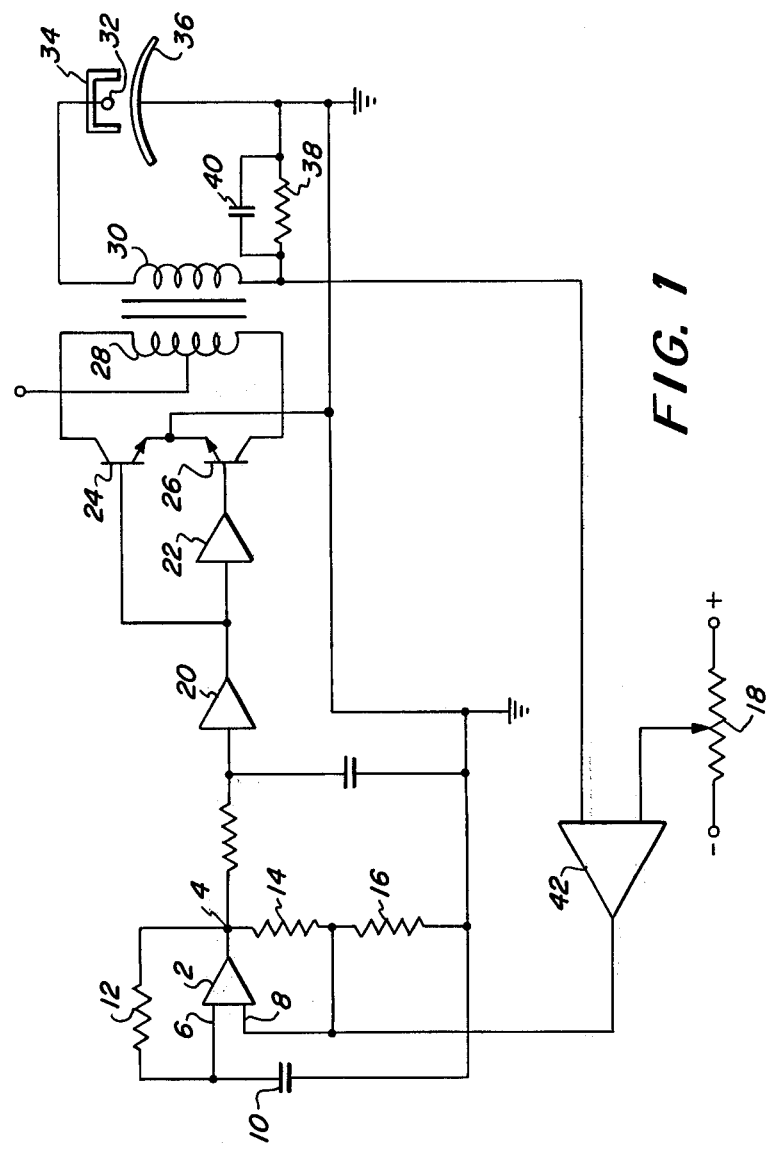
FIG. 1 is a simplified schematic of the power supply.
Figure 2:
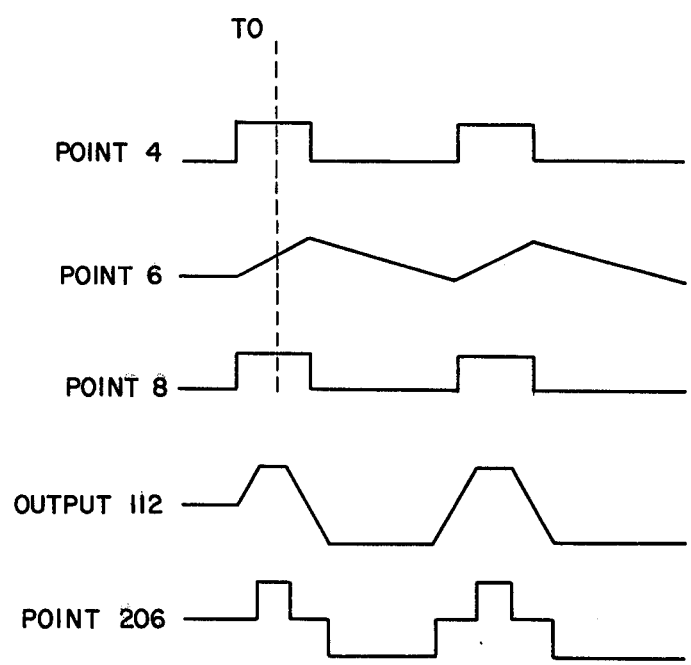
FIG. 2 shows the timing relationship of the various wave shapes.

The preferred embodiment of this invention comprises a non-symmetrical rectangular wave generator to supply current to a high-voltage transformer primary, the secondary of which is connected to a corotron or some other non-linear a.c. load, and may be conveniently discussed in relation to the simplified schematic diagram shown in FIG. 1 and the idealized wave shapes shown in FIG. 2.

Operational Amplifier (Op Amp) 2 generates the non-symmetrical rectangular wave as follows.

Point 6 is the Inverting Input to the Op Amp 2 and Point 8 is the Non-Inverting Input. The Output of the Op Amp is supplied to Point 4. If, at a point in time, TO, the voltage at the Inverting Input 6 is negative of the voltage at the Non-Inverting Input Point 8 then the voltage at the Output 4 will be maximum positive. This voltage will be felt through voltage divider Resistors 14 and 16 to Point 8 immediately, but will be felt at Point 6 slowly because of the time constant produced by Resistor 12 and Capacitor 10. The voltage at Point 6 will build slowly because of this time constant until it becomes more positive than the voltage at Point 8, at which point the Op Amp 2 will switch, driving the voltage at Point 4 negative. Again, this negative voltage will not be felt immediately at Point 6 because of the resistive capacitive time constant.

Because of Adjustment Resistor 18 the points of reversal in the wave shape shown as Points 4, 6 and 8 of FIG. 2 can be adjustable. For instance, if the switching point is set at some positive voltage, and assuming that the output of Op Amp 2 varies between an identical positive and negative d.c. voltage, then it can be seen that because of a smaller differential voltage, Capacitor 10 will charge in a positive direction in less time than it will in a negative direction. This would result in the wave shapes shown in FIG. 2 where the output of Op Amp 4 would be negative for a longer time than it would be positive.

The resultant rectangular wave is amplified in Op Amp 20, inverted in Op Amp 22 and applied to an audio push/pull amplifier comprising Transistors 24 and 26. These push/pull amplifiers drive center tapped Transformer Primary 28 and the output from Secondary 30 is applied to the Corotron Wire 32. A wave shape resembling the Point 4 wave shape in FIG. 2 will be applied to the Corotron at an a.c. voltage of approximately four thousand volts. However, because of the non-symmetry of this wave shape and because of the face that the output of a transformer secondary will average zero, the positive instantaneous voltage applied to the Corotron wire will exceed the negative voltage applied to the Corotron Wire by a significant amount. Instantaneous application of more than 3,000 volts negative or 3,200 volts positive on the Corotron Wire with respect to the Corotron Channel 34, which is held at ground potential, will result in a corona between the Wire 32 and the Channel 34 and between Wire 32 and the semiconductor Drum Surface 36. As described above, the Corotron has a rectifying effect which will produce a d.c. bias in the Corotron. The wave shapes shown in FIG. 2 will result in increased conduction when the corotron wire is positive in compensation for the normal amount of negative current normally found in the Corotron. The result is that by the adjustment of Resistor 18, the total bias current can be maintained at zero or any positive or negative value.

The low end of Transformer Secondary 30 is connected through a Sensing Resistor 38 to ground. This Sensing Resistor voltage is filtered by Capacitor 40 and will, therefore, be an indication of the d.c. current flowing in the system. This d.c. level is applied to one of the two inputs of Op Amp 42, where the other input is the Symmetry Adjustment Resistor 18. The result is that when the d.c. bias current, as measured at Resistor 38, exceeds or falls below the level determined by the adjustment of Resistor 18, a correction signal is generated by Op Amp 42 and is applied to the Non-Inverting Input 8 of Op Amp 2, correcting the symmetry of the resultant rectangular wave, in order to regulate the bias current flowing through the Corotron Wire to its adjusted level.

Figure 3:
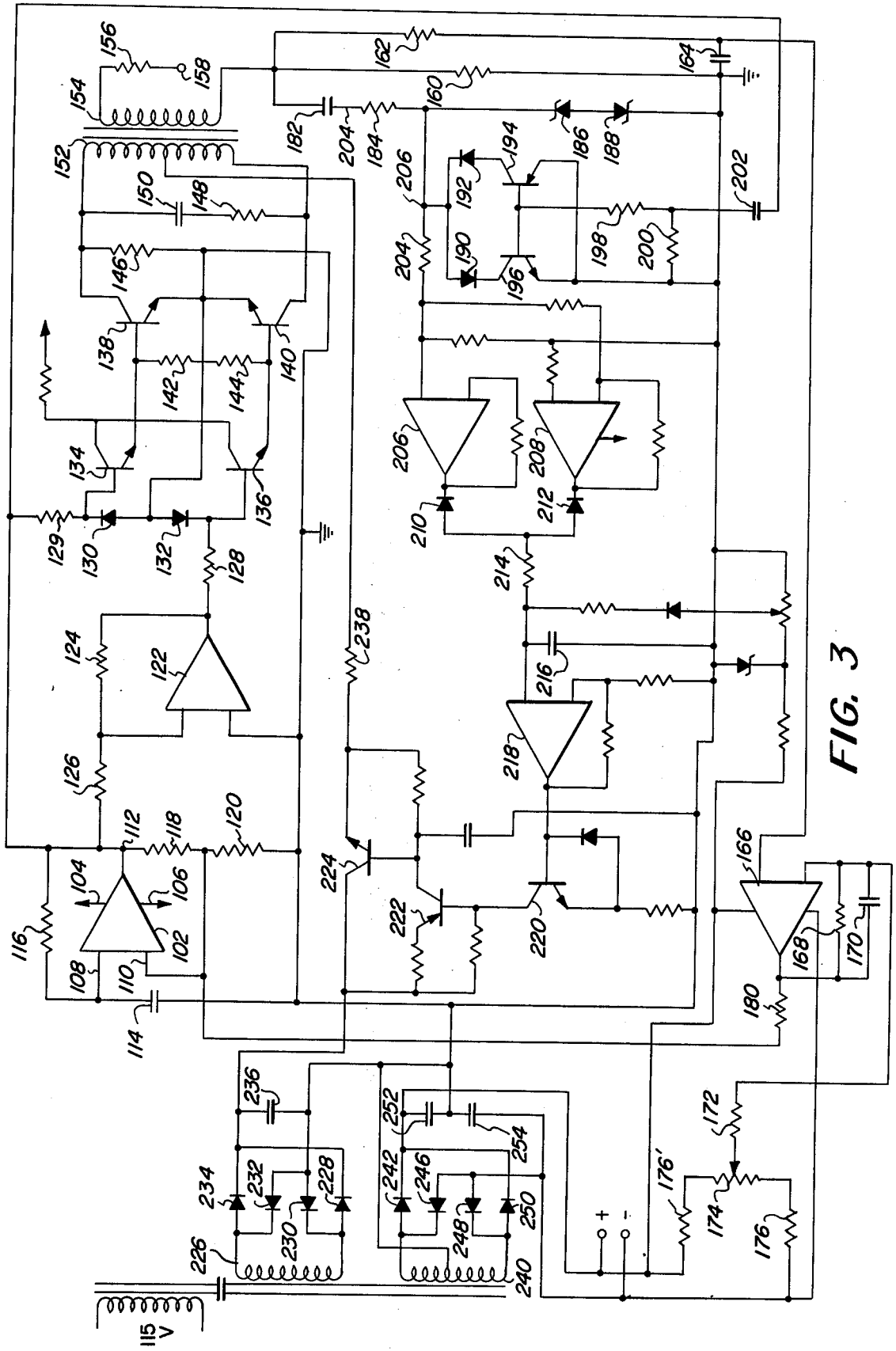
FIG. 3 is a detailed schematic of the power supply.

FIG. 3 is a detailed schematic of the Power Supply. Op Amp 102 is used to generate the basic rectangular wave shape. It receives a nominal plus and minus 12 volts at the Power Input Pins 104 and 106, and is supplied with an Inverting Input 108, a Non-Inverting Input 110, and an Output 112. The RC circuit comprising Capacitor 114 and Resistor 116 determine the duty cycle of the rectangular wave in conjunction with Resistors 118 and 120. The common point between Resistors 118 and 120 is tied to the Non-Inverting Input of Op Amp 102 and also receives a d.c. regulation voltage which will be discussed below. This regulation voltage may go above or below zero volts and determines and switching point of the Operational Amplifier.

Because the output of the Op Amp is switching between plus and minus 12 volts, it is clear that when the output is at minus 12 volts and the Inverting Input Point 108 is switching at a positive voltage there is more voltage across Resistor 116 than there would be if the switching point were negative. Thus it can be seen that for a negative switching point the current flowing through Resisto 116 will be less for a negative output and greater for a positive output. The result of this decreased current when the Output is negative and an increased current when the Output is positive would result in the positive output at Point 112 being shorter in duration than the negative output. Thus it can be seen that the adjustment voltage applied at the Non-Inverting Input Point 110, in conjunction with the voltage divider Resistors 118 and 120, determines the duty cycle of the rectangular wave in that it determines the percentage of total time that the Operational Amplifier will be switched positive as opposed to the time it will be switched negative.

This output at Point 112 is transmitted to Operational Amplifier 122 which, along with Resistors 124 and 126, implements a simple inverting circuit. The rectangular wave output is then transmitted through resistors 128 and 129 to a typical push/pull audio amplifier comprising Diodes 130 and 132, Transistors 134, 136, 138, and 140, Resistors 142, 144, 146, and 148, and Capacitor 150. This audio amplifier arrangement drives the center tapped Transformer Primary 152 which receives its positive d.c. voltage at the center tap. The non-symmetrical rectangular wave is developed at the Secondary 154 and is applied through Resistor 156 to the Corotron Wire 158.

A return line from the low end of Transformer Secondary 154 is connected to ground through Sensing Resistor 160 and develops a voltage which, when filtered by Resistor 162 and Capacitor 164 provides an indication of the d.c. bias current, which is sent to Op Amp 166. The other input to this Operational Amplifier is connected through Resistor 172 to a Variable Resistor 174, which in turn is connected through Risistors 176' and 176 to sources of both positive and negative voltages. Thus the voltage available at Resistor 174 and thereafter to the input of Operational Amplifier 166 can be varied both positively and negatively, and thereby adjusted to any voltage. The Sensing Resistor 160 voltage being fed to the other input of Operational Amplifier 166 is compared against this reference and a correction voltage is applied through Resistor 180 to the Input 110 of Operational Amplifier 102. As explained above, this correction voltage will vary the symmetry, and ultimately will vary the amount and direction of the d.c. bias current in the Corotron 158. Thus a closed loop feedback system is shown where the symmetry of the rectangular wave is varied to regulate the amount of d.c. bias according to a present adjustment.

Because the variation in symmetry may effect the amplitude of the a.c. voltage being applied to the Corotron, a separate a.c. voltage regulation circuit is provided. In this case, the Sensing Resistor 160 voltage which has not been filtered is applied through Capacitor 182 and Resistor 184 to back-to-back Zener Diodes 186 and 188. These Zener Diodes are simply a safety device to prevent large amplitude spurious signals from damaging the remainder of the regulation circuit.

The network comprising Diodes 190 and 192, Transistors 194 and 196, Resistors 198 and 200, and Capacitor 202 comprise a circuit for clamping the output from the Sensing Resistor to ground during periods when that output is varying and to unclamp the output from the Sensing Resistor during periods when the output of the Sensing Resistor is stable. What this amounts to, as shown in FIG. 2, is an input from the square wave generator Op Amp 102 output 112 through a differentiation network comprising Capacitor 202 and Resistor 200. The output of this differentiation network will be positive for rising wave shapes, negative for falling wave shapes, and zero for stable wave shapes. If the wave shape at the output of the differentiation network is positive, Transistor 194 will conduct, clamping point 206 to ground. Likewise, if the wave shape is a negative going wave shape, Transistor 196 will conduct, clamping Point 206 to ground. Only when the output of the rectangular wave generator is in a stable positive or negative condition will the output of the differentiation circuit be zero allowing neither Transistor 194 nor 196 to conduct and therefore allowing the rectangular wave shape, which will be at its maximum positive or negative value, to continue through Resistor 204 into either Operational Amplifier 206 or 208. These wave shapes are shown in FIG. 2.

Op Amp 206 is implemented as a non-inverting amplifier and Operational Amplifier 208 is an inverting amplifier. In conjunction with Diodes 210 and 212, the output applied to Resistor 214 will be a negative voltage corresponding alternatively to the positive and negative amplitude of the rectangular wave. This output is averaged by means of the R.C. circuit comprising Resistor 214 and Capacitor 216 and is applied to Operational Amplifier 218, configured as an amplifier, and through Transistors 220 and 222 to either increase or decrease the amount of current through Transistor 224.

Transistor 224 connects the high-voltage Primary Transformer 152 center tap to the high-voltage d.c. power supply. This high-voltage power supply is implemented in the form of a full-wave solid state rectifier comprising Transformer Secondary 226, four Diodes 228 through 234 configured as a bridge type full-wave rectifier and Capacitor 236 which provides filtering for the output d.c. voltage.

Power Transistor 224 allows more or less of this d.c. current to pass through Resistor 238 to the center tap of the a.c. Transformer Primary which, in turn, supplies a greater amount of power to the push/pull audio amplifier Transistors 138 and 140 and therefore results in a higher a.c. voltage applied to the Corotron at Point 158. Thus the a.c. high-voltage is also adjustable and regulated in this power supply.

A second bridge-type rectifier comprising Transformer Secondary 240, Diodes 242 through 250 and Capacitors 252 and 254 comprise a source of both positive and negative d.c. voltage for the Adjustable Resistor 174 which is used in the symmetry regulation circuit.

The circuit as shown in FIG. 3 accomplishes the objectives of this invention in that a single power supply is used to produce both a.c. and d.c. voltage applied to the Corotron, and the regulation in all cases is done at a low voltage. As can be seen from the schematic in FIG. 3 the entire sensing and regulating circuits are implemented in circuits operating at less than 12-volts d.c. levels, thus providing a low-cost and reliable Corotron power supply.

The description preferred embodiment has been usef in connection with a Corotron but this power supply could also be used with any non-linear load requiring high a.c. and low bias d.c. voltages. Likewise, a specific circuit has been shown for developing a bias d.c. current by varying the symmetry of the a.c. wave shape but it is contemplated that any equivalent circuit for using an adjustable wave shape symmetry to regulate a d.c. bias current could be used in connection with this invention.

While a particular embodiment of the present invention has been described and illustrated, will be apparent to those skilled in the art that changes and modifications may be made therein without departure from the spirit and scope of the invention as claimed.

What is claimed is:

1. An a.c. and d.c. power supply for driving a non-linear load in which current over the operating voltage range increases faster or slower than applied voltages comprising:
   generating means for generating non-symmetrical a.c. voltage waveshape,
   a transformer for coupling said a.c. waveshape from said generating means to said load such that the sum of all instantaneous positive and negative a.c. voltages at said load will be approximately zero,
   d.c. feedback means for sensing the d.c. current at said load produced by the application of said non-symmetrical a.c. voltage to said non-linear load, and for producing and coupling to said generating means a correction signal to vary the symmetry of said a.c.

waveshape to regulate said load d.c. current to a pre-determined level.

2. The apparatus of claim 1 wherein said generating means generates an a.c. waveshape that is substantially rectangular.

3. The apparatus of claim 1 wherein said load is a corotron.

4. The apparatus of claim 3 wherein said generating means comprises:
   a rectangular wave generator, and
   amplifier means for amplifying said rectangular wave, and for coupling said rectangular wave to said transformer, and
   wherein said correction signal from said d.c. feedback means is coupled to said rectangular wave generator.

5. The apparatus of claim 4 further comprising:
   a.c. feedback means for sensing the a.c. voltage at said load, and for producing and coupling to said amplifier means a correction signal to vary the amplification of said amplifier means to regulate said a.c. voltage to a pre-determined level.

6. The apparatus of claim 5 wherein said predetermined a.c. voltage level is adjustable.

7. An a.c. and d.c. power supply for driving a non-linear load in which current over the operating range increases faster or slower than applied voltage comprising:
   a rectangular wave generator for generating a substantially rectangular waveshape,
   a push-pull amplifier for amplifying said waveshape,
   a transformer for receiving the output of said push-pull amplifier at the ends of said transformer primary, and for coupling said output to said load such that the sum of all instantaneous positive and negative a.c. voltages at said load will be approximately zero,
   a d.c. power source coupled to the center tap of said transformer primary, and
   d.c. feedback means for comparing the d.c. current at said load produced by the application of a non-symmetrical a.c. voltage to said non-linear load against a first adjustable reference, and for producing and coupling to said rectangular wave generator a correction signal to vary the symmetry of said a.c. waveshape to regulate said d.c. current to a pre-determined level.

8. The apparatus of claim 7 further comprising a.c. feedback means for comparing the a.c. voltage at said load against a second adjustable reference, and for producing and coupling to said d.c. power source a correction signal to vary the d.c. power and therefore the amplification of said amplifier to regulate said a.c. voltage to a pre-determined level.

* * * * *

UNITED STATES PATENT AND TRADEMARK OFFICE
CERTIFICATE OF CORRECTION

PATENT NO. : 4,038,593

DATED : July 26, 1977

INVENTOR(S) : Halsey P. Quinn

It is certified that error appears in the above–identified patent and that said Letters Patent are hereby corrected as shown below:

Claim 7, line 4, before "rectangular" insert --non-symmetrical--; and after "rectangular" insert --voltage--.

Signed and Sealed this

First Day of November 1977

[SEAL]

Attest:

RUTH C. MASON
*Attesting Officer*

LUTRELLE F. PARKER
*Acting Commissioner of Patents and Trademarks*